United States Patent Office 3,115,349
Patented Dec. 24, 1963

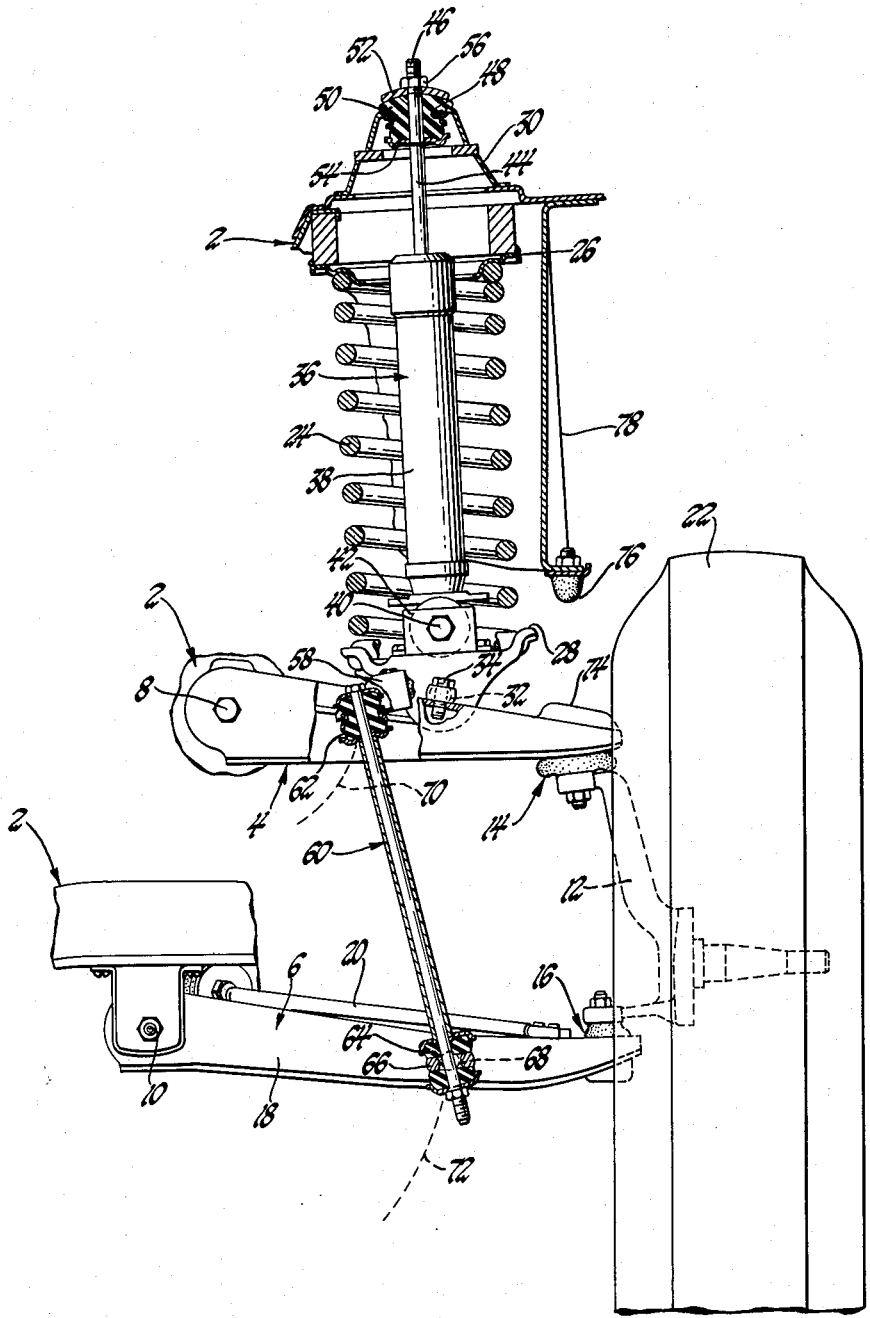

3,115,349
INDEPENDENT FRONT WHEEL SUSPENSION
William A. Lerg, Detroit, Mich., assignor to General Motors Corporation, Detroit, Mich., a corporation of Delaware
Filed May 31, 1962, Ser. No. 198,958
2 Claims. (Cl. 280—96.2)

This invention relates to vehicle suspension and more particularly to independent front wheel suspension of the type wherein the elastic medium is disposed between the sprung mass and the upper of a pair of transversely extending vertically spaced wheel control arms.

In prior art constructions of the type defined, it has been the practice to mount a coil spring between an upper spring seat fixed on the superstructure and a lower spring seat tiltably mounted on the upper control arm. In such arrangements, a telescoping shock absorber extends coaxially of the spring with the upper end of the piston rod resiliently attached to the superstructure and the lower end of the casing rigidly secured to the lower spring seat so that the latter must remain perpendicular to the telescoping axis of the shock absorber. As a result, any tilting tendency of the lower seat induces side loads on the sliding seal between the upper end of the casing and the piston rod which may result in premature failure of the shock absorber.

An object of the invention is to provide an improved vehicle suspension.

Another object is to provide an improved parallel wishbone type independent wheel suspension of the type having a coil spring disposed between the upper control arm and the vehicle superstructure.

A further object is to provide a construction of the stated character wherein the coil spring is disposed between a fixed upper spring seat and a lower spring seat which is tiltably mounted on the control arm on an axis parallel to the axis of motion of the arm and including means for controlling the angular inclination of the seat so that the upper and lower seats remain substantially parallel throughout the normal range of deflection of the wheel suspension.

A still further object is to provide a structure of the stated character wherein the length of the lower control arm is substantially greater than the length of the upper control arm and the means for controlling the angular inclination of the seat operates as a function of the differential angular inclination of the upper and lower control arm incident to deflection of the wheel.

Still another object is to provide a construction of the type described including a telescoping shock absorber mounted coaxially of the spring seats in a manner entirely eliminating imposition of bending loads on the shock absorber as a result of suspension deflection.

Yet a further object is to provide a structure of the type described wherein the lower spring seat is pivotally mounted on the upper control arm and connected by a link to the lower control arm.

These and other objects, advantages and features of the invention will become more fully apparent as reference is had to the accompanying specification and drawing. The single FIGURE of the drawing is a rear end elevation of a front wheel suspension in accordance with the invention.

Referring now to the drawing, there is shown a suspension construction for one of the usual pairs of dirigible wheels at the front of the vehicle. In the illustrated construction, the reference numeral 2 designates the integral body and frame type superstructure. Extending transversely outwardly from body frame 2 are a pair of vertically spaced wheel control arms 4 and 6, the inboard ends of which are pivoted to the body frame on generally longitudinally extending axes 8 and 10, respectively. The outboard ends of arms 4 and 6 in turn are pivotally connected respectively to the upper and lower ends of a generally vertically extending wheel knuckle member 12 by ball joint assemblies 14 and 16. Upper control arm 4 is a unitary A frame stamped metal member having longitudinally spaced apart inboard ends, while lower control arm 6 comprises a channel section sheet metal beam 18 and a diagonally disposed strut rod 20, the rearward end of which is secured, as by riveting, to beam 18 near its outer end. The forward end of strut 20 is flexibly mounted to body frame 2 forwardly of the in board end of beam 18 and in proximity to the projected axis 10.

In the embodiment shown, the body frame 2 and additional vehicle sprung mass, not shown, is elastically supported relative to wheel 22 by a coil spring 24 which is disposed in compression between an upper spring seat 26 and a lower spring seat 28. Seat 26 is rigidly mounted within and near the upper end of a dome-like portion 30 of body frame 2, while lower spring seat 28 is tiltably mounted on the upper surface of upper control arm 4 intermediate the inboard and outboard end thereof by a pivot shaft 32 secured to arm 4 by bolts 34. A telescoping hydraulic shock absorber 36 is disposed concentrically within coil spring 24 with the lower end of the casing 38 thereof pivotally connected by a shaft 40 to a bracket 42 secured on the central upper surface of lower spring seat 28. Shock absorber 36 includes a piston rod 44 which extends through the upper end of casing 38. The upper end 46 of rod 44 projects through an opening 48 at the top of dome portion 30 and is secured therein by a biscuit type rubber mount 50 which is compressed between washers 52 and 54 by nut 56.

In the illustrated embodiment, the axis of shaft 32 is aligned so that the lower spring seat may tilt on an axis parallel with the inboard axis 8 of control arm 4. Similarly, the pivot shaft 40 at the lower end of shock absorber casing 38 is disposed relative to spring seat 28 so that the axis thereof is also parallel to control arm axis 8. In consequence, the shock absorber is entirely free of bending load or aligning function for the lower spring seat.

According to the present invention, the angular position of lower spring seat 28 is stabilized and maintained independently of the shock absorber so that the seating plane remains in substantial parallelism with the seating plane of upper spring seat 26 throughout the entire range of deflection of wheel 22. To accomplish this purpose in accordance with the invention, spring seat 28 is formed with a finger extension 58 which is flexibly connected to the upper end of a generally vertically extending rod assembly 60 by a compression rubber mount 62. The lower end of rod assembly 60 in turn is flexibly connected by a compression rubber mount 64 to an eye structure 66 formed at one end of a shaft 68 pivotally mounted on lower control arm 6 on a longitudinally extending axis. In practice, the angular position of lower spring seat 28 is determined by the differential radii of imaginary circles 70 and 72 generated from axes 8 and 10 passing through the geometric centers of rubber mounts 62 and 64, respectively. Thus, since mount 64 travels a greater distance than mount 62 for each increment of wheel deflection, lower spring seat 28 will swing clockwise at a predetermined rate while arm 4 is swinging counterclockwise at a lesser rate. Consequently, seat 28 is maintained in substantial parallelism with upper spring seat 26 irrespective of the continuing change in inclination of upper control arm 4 during rising and falling movement of wheel 22.

In order to resiliently limit the compression deflection of the suspension, the outer end of upper arm 4 is provided with an abutment portion 74 overlying ball joint assembly 14 which engages an elastic bump stop 76 secured to the lower end of a depending shroud 78 surrounding spring 24.

While but one embodiment of the invention has been shown and described, it will be apparent that other changes and modifications may be made therein. It is, therefore, to be understood that it is not intended to limit the invention to the embodiment shown, but only by the scope of claims which follow.

I claim:

1. In a vehicle suspension, a superstructure, a pair of vertically spaced transversely extending control arms pivotally mounted at their inboard ends for swinging movement about vertically spaced longitudinally extending pivot axes fixed with respect to said superstructure, a vertically extending wheel knuckle pivotally attached at its upper and lower end to the respective outboard ends of said control arms, an upper spring seat disposed on said superstructure above the upper of said arms, a lower spring seat tiltably mounted on said last mentioned arm for movement about a generally longitudinally extending axis, a link pivotally connected at its upper end to said tiltable seat inboard of said last mentioned axis and at its lower end to the lower of said control arms outboard of said upper end, a helical spring disposed in compression between said spring seats, a telescoping shock absorber disposed concentrically within said spring, means pivotally connecting the upper end of said shock absorber to said superstructure, and means pivotally connecting the lower end of said shock absorber to said tiltable spring seat for movement on a generally longitudinally extending axis spaced above the tilting axis of said seat.

2. The structure set forth in claim 1 wherein the spring engaging portion of said lower spring seat lies in a plane located above the tilting axis of said seat.

References Cited in the file of this patent

UNITED STATES PATENTS

| 2,621,919 | Utz | Dec. 16, 1952 |
| 2,756,067 | Porsche et al. | July 24, 1956 |

FOREIGN PATENTS

| 539,597 | Great Britain | Sept. 17, 1941 |

OTHER REFERENCES

The Society of Automotive Engineers Journal, April 1960, page 55, illustration of the Falcon suspension.